United States Patent
Chakra et al.

(10) Patent No.: US 9,363,217 B2
(45) Date of Patent: *Jun. 7, 2016

(54) INDICATING IN AN ELECTRONIC MESSAGE WHETHER A USER HAS PREVIOUSLY ACCESSED CONTENT PROVIDED BY A RESOURCE

(71) Applicant: International Business Machines Corporation, Armonk, NY (US)

(72) Inventors: Al Chakra, Apex, NC (US); Liam Harpur, Skerries (IE); John Rice, Blanchardstown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/938,490

(22) Filed: Jul. 10, 2013

(65) Prior Publication Data

US 2015/0012600 A1    Jan. 8, 2015

Related U.S. Application Data

(63) Continuation of application No. 13/936,615, filed on Jul. 8, 2013.

(51) Int. Cl.
*G06F 15/16* (2006.01)
*H04L 12/58* (2006.01)
(Continued)

(52) U.S. Cl.
CPC ............... *H04L 51/18* (2013.01); *H04L 51/24* (2013.01); *G06F 17/211* (2013.01); *G06F 17/2235* (2013.01); *G06F 17/3089* (2013.01); *H04L 51/08* (2013.01); *H04L 67/22* (2013.01)

(58) Field of Classification Search
CPC ... H04L 67/22; G06F 17/211; G06F 17/2235; G06F 17/3089
USPC .......................................................... 709/206
See application file for complete search history.

(56) References Cited

U.S. PATENT DOCUMENTS

6,052,730 A * 4/2000 Felciano et al. .............. 709/225
6,742,030 B1   5/2004 MacPhail
(Continued)

FOREIGN PATENT DOCUMENTS

CA        2402809 A1 *  3/2004  ........ G06F 17/30876

OTHER PUBLICATIONS

"Anti-Spam: Prevent Duplicate Links," [online] Status.Net, Sep. 5, 2009 [retrieved Jul. 8, 2013] retrieved from the Internet: < http://status.net/open-source/issues/1860>, 2 pg.

*Primary Examiner* — Wing F Chan
*Assistant Examiner* — Joseph Maniwang
(74) *Attorney, Agent, or Firm* — Cuenot, Forsythe & Kim, LLC

(57) ABSTRACT

Arrangements described herein relate to indicating in an electronic message whether a user has previously accessed content provided by a resource. An electronic message can be received. The electronic message can include at least one uniform resource identifier. A determination can be made as to whether a user to whom the electronic message is sent has previously accessed content provided by a resource identified by the uniform resource identifier. In the electronic message, whether the user has previously accessed the content provided by the resource identified by the uniform resource identifier can be indicated.

12 Claims, 4 Drawing Sheets

(51) Int. Cl.
*H04L 29/08* (2006.01)
*G06F 17/21* (2006.01)
*G06F 17/30* (2006.01)
*G06F 17/22* (2006.01)

(56) References Cited

U.S. PATENT DOCUMENTS

| | | | |
|---|---|---|---|
| 6,886,013 B1 | 4/2005 | Beranek | |
| 8,886,660 B2* | 11/2014 | Dombrowski et al. | 707/758 |
| 2002/0075302 A1* | 6/2002 | Simchik | 345/745 |
| 2002/0178007 A1* | 11/2002 | Slotznick et al. | 704/270.1 |
| 2004/0107267 A1* | 6/2004 | Donker et al. | 709/218 |
| 2006/0101514 A1* | 5/2006 | Milener et al. | 726/22 |
| 2006/0155707 A1* | 7/2006 | Marcjan | G06F 17/30876 |
| 2009/0100322 A1* | 4/2009 | Phillips et al. | 715/205 |
| 2009/0248806 A1 | 10/2009 | Teman | |
| 2012/0066379 A1* | 3/2012 | Zhou et al. | 709/224 |
| 2012/0226688 A1* | 9/2012 | Reid | G06F 17/30997 707/733 |
| 2013/0111368 A1* | 5/2013 | Laughlin | 715/760 |
| 2014/0181216 A1* | 6/2014 | Liebmann | H04L 51/18 709/206 |
| 2014/0359490 A1* | 12/2014 | Ma | 715/760 |

\* cited by examiner

300

---

Receive an electronic message including at least one uniform resource identifier
302

---

Determine, using a processor, whether a user to whom the electronic message is sent has previously accessed content provided by a resource identified by the uniform resource identifier
304

---

Indicate, in the electronic message, whether the user has previously accessed the content provided by the resource identified by the uniform resource identifier
306

FIG. 3

INDICATING IN AN ELECTRONIC MESSAGE WHETHER A USER HAS PREVIOUSLY ACCESSED CONTENT PROVIDED BY A RESOURCE

CROSS-REFERENCE TO RELATED APPLICATIONS

This application is a continuation of application Ser. No. 13/936,615, filed on Jul. 8, 2013, which is fully incorporated herein by reference.

BACKGROUND

Arrangements described herein relate to identifying content accessible via a communication network.

People commonly use the Internet to access and view content. For example, via a client device, such as a desktop computer, laptop computer or smartphone, a user can connect to an Internet search engine to search the internet for consumable content. Users commonly use a web browser for this purpose. In a typical scenario, the Internet search engine will return a plurality of results that potentially match search criteria specified by the user. The search results usually are provided as hyperlinks which, when selected by the user, will navigate the user's web browser to a corresponding website or web portal, or initiate download of corresponding content to the user's client device. In the case that a download is initiated, the user typically is prompted to indicate whether to proceed with, or cancel, the download.

BRIEF SUMMARY

One or more embodiments disclosed within this specification relate to identifying content accessible via a communication network and, more particularly, to indicating in an electronic message whether a user has previously accessed content provided by a resource.

A method of includes receiving an electronic message including at least one uniform resource identifier, determining, using a processor, whether a user to whom the electronic message is sent has previously accessed content provided by a resource identified by the uniform resource identifier, and indicating, in the electronic message, whether the user has previously accessed the content provided by the resource identified by the uniform resource identifier.

BRIEF DESCRIPTION OF THE SEVERAL VIEWS OF THE DRAWINGS

FIG. 3 is a flow chart illustrating a method of indicating whether a user has previously accessed content provided by a resource in accordance with an embodiment disclosed within this specification.

DETAILED DESCRIPTION

Figure 1:
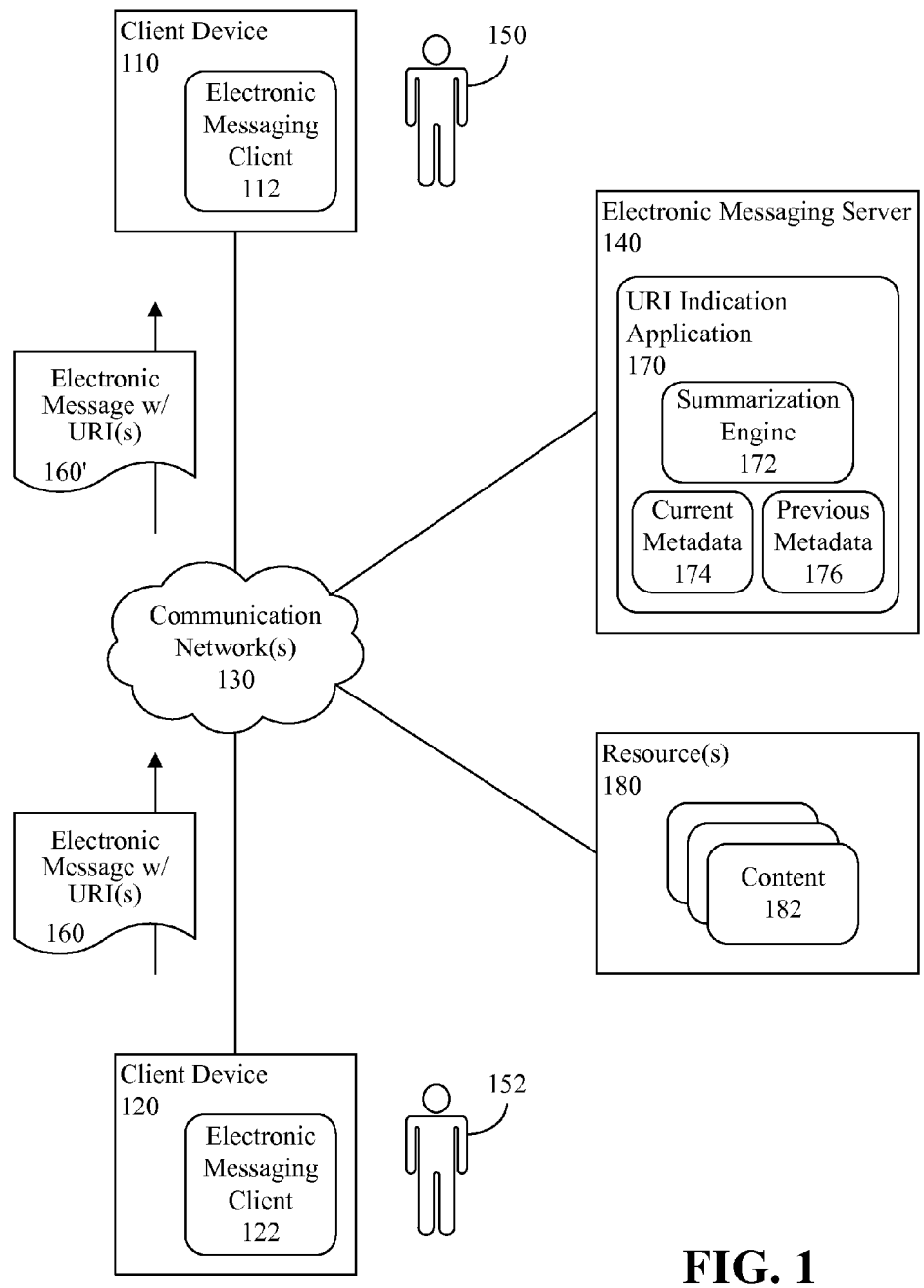
FIG. 1 is a block diagram illustrating a system for indicating whether a user has previously accessed content provided by a resource in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. As defined herein, the term "computer-readable storage medium" means a tangible storage medium that contains or stores program code for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to indicating, in an electronic message, whether a user has previously accessed content provided by a resource identified by a uniform resource identifier (URI) included in the electronic message. In illustration, if an e-mail or text message that includes a URI, for example in the body of the e-mail or text message, is sent to a user, a determination can be made whether the user has previously accessed content provided by the URI. If so, an indication can be provided alerting the user to the fact that the user has previously accessed the content. If the user has not previously accessed the content, the indicator can indicate such.

Accordingly, based on the indicator, the user will know whether or not he/she has previously accessed the content. If the user has previously accessed the content, the indicator can serve as a prompt for the user to recall from memory information provided by the content. The user may, upon noticing the indicator, recall the information. If the user does not recall the information, or the indicator indicates that the user has not previously accessed the content, the user can select the URI, which may be provided as a hyperlink, to access the content. Further, content may change over time. If the content provided by the resource indicated by the URI has changed significantly since the previous time the user accessed the content, the indicator provided can indicate either that the content has changed significantly since such time, or merely indicate that the user has not accessed the content as currently presented.

Several definitions that apply throughout this document will now be presented.

As used herein, the term "user" means a person (i.e., human being), for example a person using a device and/or system described herein.

As used herein, the term "electronic message" means an e-mail or a text message sent to at least one user.

As used herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As used herein, the term "text message" means a message comprising text delivered via a communication network to at least one user identified as a recipient. A text message may be sent by one user to one or more other users. In this regard, a text message typically identifies at least one recipient using a user name, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As used herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As used herein, the term "uniform resource identifier" means a string of characters that identify a resource available via a communication network, such as the Internet/World Wide Web. Herein, a uniform resource identifier may be referred to by the acronym "URI." A uniform resource locator (URL) and a uniform resource name (URN) are examples of a uniform resource identifier. In some instances, a uniform resource identifier may be provided in a hyperlink.

As used herein, the term "hyperlink" means a reference that points to a resource available via a communication network and, when selected by a user, automatically navigates an application to the resource. In this regard, a hyperlink can include hypertext. The application may be an application suitable to access and/or render the content provided by the resource. For example, when a hyperlink is selected, content provided by a resource identified by the hyperlink can be presented via the application, or an option to download such content can be provided.

As used herein, the term "content" means information configured to be presented to one or more users. Content includes text, audio, one or more images, video, or any combination of text, audio, image(s) and/or video.

As used herein, the term "metadata" means data that describes other data and/or at least one container of data. Metadata generally is not visible to a user in a document unless the user specifically requests to view the metadata.

FIG. 1 is a block diagram illustrating a system 100 for indicating whether a user has previously accessed content provided by a resource in accordance with an embodiment disclosed within this specification. The system can include a client device 110 and a client device 120 communicatively linked via one or more communication network(s) 130. Each client device 110, 120 can include a respective processor and memory configured to perform respective processes described herein. The communication network(s) 130 can be implemented as, or include, any of a variety of different networks such as a WAN, a LAN, a wireless network, a mobile network, a Virtual Private Network (VPN), the Internet, the Public Switched Telephone Network (PSTN), or the like. Each client device 110, 120 can include a respective processor and memory configured to perform operations and/processes described herein related to the respective client devices 110, 120.

In one arrangement, the client device 110 can include an electronic messaging client 112 configured to send and/or receive electronic messages. In another arrangement, the client device 110 can include an application, such as a web browser, configured to enable the client device 110 to access and use an electronic messaging client hosted by another system, such as an electronic messaging server 140. Similarly, in one arrangement, the client device 120 can include an electronic messaging client 122 configured to send and/or receive electronic messages. In another arrangement, the client device 110 can include an application, such as a web browser, configured to enable the client device 110 to access and use an electronic messaging client hosted by another system, such as an electronic messaging server 140 or another suitable processing system.

The electronic messaging server 140 can include one or more processors and memory configured to processes one or more electronic messages communicated between the client devices 110, 120. In illustration, a user 152 of the client device 120 can send an electronic message 160 to a user 150 of the client device 110. The electronic message 160 can include one or more URIs identifying content 182 provided by respective resources 180. A URI can be, for example, presented in a hyperlink comprising hypertext that, when selected, automatically initiates access to the content 182 on behalf of the user 150.

The content 182 can be an entire web page, document, or the like, or the content 182 can be a portion of larger content that includes the content 182 and one or more other portions of content. For example, a web page may include a plurality of sections, and the URI can identify a particular section. Similarly, a document may include multiple paragraphs or sections, and the URI can identify a particular paragraph or section.

In one arrangement, the electronic messaging server 140 can receive the electronic message 160 from the client device 120, and process the electronic message 160 using a URI indication application 170 to generate the electronic message 160'. In this arrangement, the client device 110 can receive the electronic message 160' from the electronic messaging server 140 and present the electronic message 160' to the user 150.

In another arrangement, the electronic messaging server 140 can pass the electronic message 160 to the client device 110, and the client device 110 can include the URI indication application 170 that processes the electronic message 160 to generate the electronic message 160'. Again, the client device 110 can present the electronic message 160' to the user 150.

Regardless of whether the URI indication application 170 is executed by the electronic messaging server 140 or the client device 110, the URI indication application 170 can determine whether the user 150 to whom the electronic message 160 is sent has previously accessed content 182 provided by a resource 180 identified by a uniform resource identifier contained in the electronic message 160. For each URI indicated in the electronic message 160, the URI indication application 170 can provide an indicator in the electronic message 160' indicating whether the user 150 has previously accessed corresponding content 182 from the resource 180 indicated by the URI. In one aspect, the indicator can be provided as a particular font, color, effect, highlight, etc. applied to the URI, though the present arrangements are not limited in this regard.

Although the determination of whether the user 150 has accessed the content 182 can be based on whether the user 150 has ever accessed the content 182, such determination also can be based on whether the user 150 has accessed the content 182 in its present form. In illustration, a determination can be made as to whether the content 182 provided by the resource 180 has changed since the user 150 previously accessed the content 182. Responsive to determining that the content 182 provided by the resource 180 has changed since the user 150 previously accessed the content 182, the indicator can indicate that the user 150 has not previously accessed the content 182 provided by the resource 180. If, however, the content 182 has not changed, the indicator can indicate that the user 150 has previously accessed the content 182 provided by the resource 180.

Moreover, the determination of whether the user 150 has accessed the content 182 can be based not only on whether the content 182 has changed, but on how much the content 182 has changed since the user 150 previously accessed the content 182. In illustration, if the content 182 has changed since the user 150 previously accessed the content 182 (e.g., the last time the user 150 accessed the content 182), an amount the content 182 has change since the user 150 previously accessed the content 182 can be determined. A threshold value can be identified and this amount can be compared to the identified threshold value. When the amount of the content 182 that has changed since the user 150 previously accessed the content 182 does not at least equal the threshold value, an indication can be provided, in the electronic message 160', that the user 150 has previously accessed the content 182 provided by the resource 180. When the amount of the content 182 that has changed since the user 150 previously accessed the content 182 at least equals the threshold value, an indication can be provided, in the electronic message 160', that the user 150 has not previously accessed the content 182 provided by the resource 180. The threshold value can be a user selectable value or a default value. By way of example, the user 150 may set the threshold value to a particular value, for instance "30%," to indicate that the user wants to be notified when content 182 previously accessed has changed by at least 30% since the user 150 last accessed the content 182.

In one arrangement, determining the amount of the content 182 that has changed since the user 150 previously accessed the content 182 can include performing natural language processing on the content 182 in its current form, for example by processing the content with a summarization engine 172 to generate corresponding metadata (current metadata) 174. Such process also can include comparing the current metadata 174 to previous metadata 176 generated from natural language processing performed on the content 182 in a previous form provided when the user 150 previously accessed to the content 182, for example the last time the user 150 accessed the content 182. In illustration, each time the user 150 accesses the content 182, the summarization engine 172 can perform natural language processing on the content 182 in the form the content 182 is presently presented, and generate metadata 176 corresponding to the content 182 as it exists in the present form when it is accessed.

Further, the URI indication application 170 can compare the current metadata 174 to the previous metadata 176 generated the previous time (e.g., the last time) the user accessed the content 182. In illustration, the URI indication application 170 can identify semantics that differ between the respective metadata 174, 176, and generate a value corresponding to the difference. In illustration, if the semantics in the metadata 174 differs from the semantics in the metadata 176 by thirty percent, the URI indication application 170 can generate a value of "30," "30%," or the like. In this regard, the generated value can be a percentage value, but this need not be the case. This generated value can be compared to the threshold value to determine whether the indication provided in the electronic message 160' is to indicate that the content 182 has previously been accessed by the user 150 or not. In illustration, if the generated value at least equals the threshold value, the indication can indicate that the user has not previously accessed the content 182. If the generated value does not at least equal the threshold value, the indication can indicate that the user has previously accessed the content 182. In one arrangement, if the generated value does not at least equal the threshold value but, nonetheless, the content has changed, the indication can indicate that the user has previously accessed the content 182, and that the content has changed since the user 150 previously accessed the content 182.

The indication(s) provided in the electronic message 160' can be presented in any suitable manner. In illustration, an indication can include a particular font, font color, highlighting or other effect applied to corresponding URI. In another arrangement, an indication can include a particular symbol, icon or the like presented proximate to the URI. Still, the indications described herein can be presented in any other suitable manner and the present arrangements are not limited in this regard.

Figure 2:
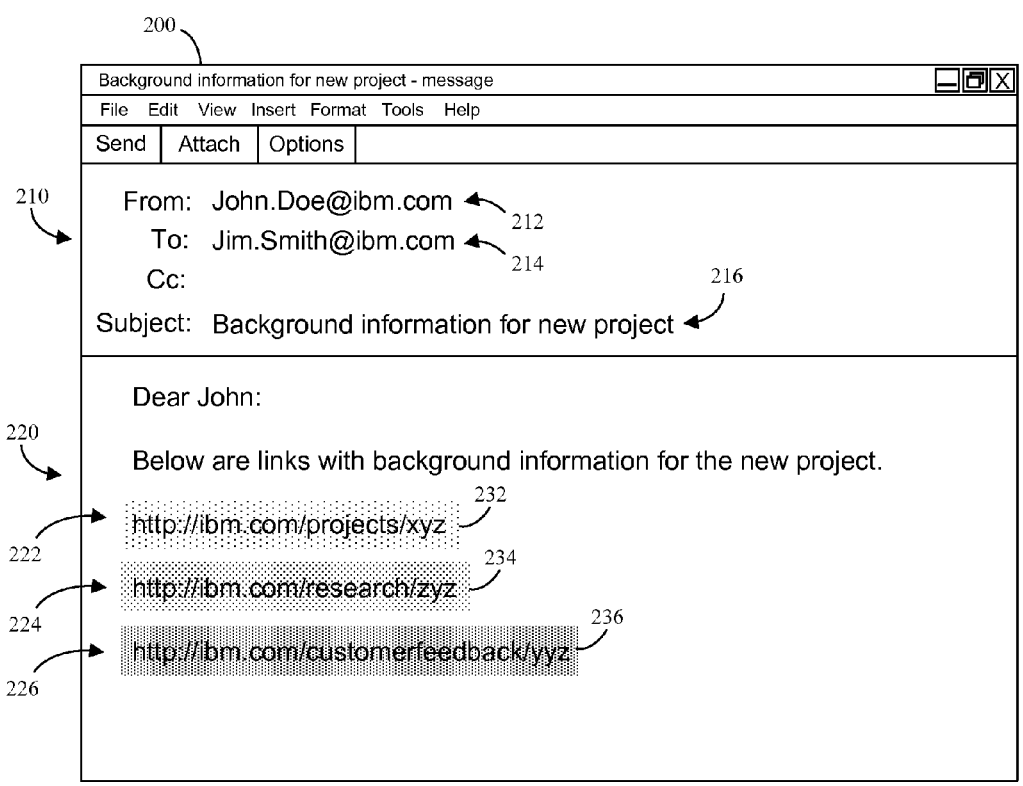
FIG. 2 is a view of an electronic message in accordance with an embodiment disclosed within this specification.

FIG. 2 is a view of an electronic message 200 in accordance with an embodiment disclosed within this specification. As noted, the electronic message 200 can be an e-mail or a text message. The electronic message 200 can include a header 210 comprising one or more fields, for example a field 212 indicating who sent the electronic message 200, a field 214 indicating to whom the electronic message 200 is sent, a subject field 216, and/or the like.

The electronic message 200 also can include a body 220 in which information (e.g., text, URI's, etc.) is presented to the user. The sender can type or paste into the body 220 of the electronic message 200 one or more URIs 222, 224, 226. For each URI 222, 224, 226, a respective indicator 232, 234, 236 can be provided to indicate whether the user has previously accessed content provided by a resource identified by the URI 222, 224, 226. Optionally, an indicator 222, 224, 226 can indicate that the user has previously accessed the content, but the content has changed since the user last accessed the content. The indicators 222, 224, 226 can be automatically added to the electronic message 200, for example as described herein, after the electronic message 200 is generated by the sender, and before or when the electronic message 200 is opened by the user.

FIG. 3 is a flow chart illustrating a method 300 of indicating whether a user has previously accessed content provided by a resource in accordance with an embodiment disclosed within this specification. At step 302, an electronic message including at least one uniform resource identifier can be received.

At step 304, a determination can be made, using a processor, as to whether a user to whom the electronic message is sent has previously accessed content provided by a resource identified by the uniform resource identifier. For example, a determination can be made as to whether the content provided by the resource has changed since the user previously accessed the content. In illustration, an amount of the content that has changed since the user previously accessed the content can be determined and compared to a threshold value.

Figure 4:
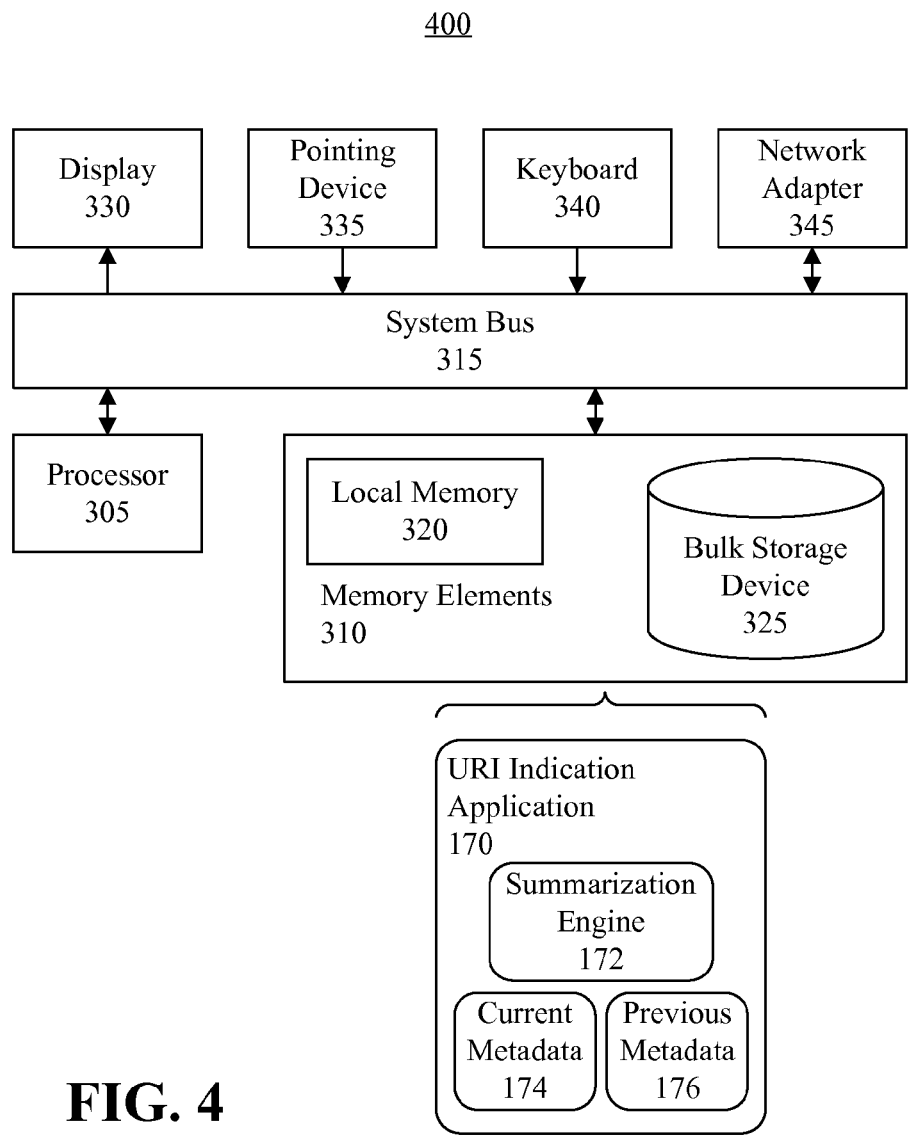
FIG. 4 is a block diagram of a processing system configured to indicate whether a user has previously accessed content provided by a resource in accordance with an embodiment disclosed within this specification.

At step 306, whether the user has previously accessed the content provided by the resource identified by the uniform resource identifier can be indicated in the electronic message. For example, if the amount of the content that has changed since the user previously accessed the content at least equals the threshold value, an indication can be provided in the electronic message indicating that the user has not previously accessed the content, or that the user has previously accessed the content, but the content has changed. If the amount of the content that has changed since the user previously accessed the content does not at least equal the threshold value, an indication can be provided in the electronic message indicating that the user has previously accessed the content FIG. 4 is a block diagram of a processing system 400 configured to indicate whether a user has previously accessed content provided by a resource in accordance with an embodiment disclosed within this specification. The processing system 400 can be implemented as the electronic messaging server 140 of FIG. 1, or the client device 110 of FIG. 1.

The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a server, a desktop computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and a keyboard 440 optionally can be coupled to the processing system 400. The I/O devices can be coupled to the processing system 400 either directly or through intervening I/O controllers. For example, the display 430 can be coupled to the processing system 400 via a graphics processing unit (GPU), which may be a component of the processor 405 or a discrete device. One or more network adapters 445 also can be coupled to processing system 400 to enable processing system 400 to become coupled to other systems, computer systems, remote printers, and/or remote storage devices through intervening private or public networks. Modems, cable modems, transceivers, and Ethernet cards are examples of different types of network adapters 445 that can be used with processing system 400.

As pictured in FIG. 4, the memory elements 410 can store the URI indication application 170 of FIG. 1. Being implemented in the form of executable program code, the URI indication application 170 can be executed by the processing system 400 and, as such, can be considered part of the processing system 400. Moreover, the URI indication application 170 is a functional data structure that imparts functionality when employed as part of the processing system 400 of FIG. 4. The summarization engine 172 and metadata 174, 176 also are functional data structures that impart functionality when employed as part of the processing system 400 of FIG. 4

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method comprising:
   receiving, by an electronic messaging server comprising a processor, from a first client device a first electronic message including at least one uniform resource identifier;
   determining, by the electronic messaging server, whether a user to whom the first electronic message is sent has previously accessed content provided by a resource identified by the uniform resource identifier by determining whether the content provided by the resource has changed since the user previously accessed the content and, if so:
      determining an amount of the content that has changed since the user previously accessed the content by performing natural language processing on the content in its current form and generating corresponding first metadata, and comparing the first metadata to second metadata generated from natural language processing performed on the content in a previous form provided when the user previously accessed the content and
      comparing the amount of the content that has changed to a threshold value;
   responsive to determining that the amount of content that has changed at least equals the threshold value, automatically generating, by the electronic messaging server, a second electronic message corresponding to the first electronic message, the second electronic message including the uniform resource identifier and indicating, in the second electronic message, that the user has not previously accessed the content provided by the resource identified by the uniform resource identifier; and
   communicating, by the electronic messaging server, the second electronic message to a second client device of the user to whom the first electronic message is sent.

2. The method of claim 1, wherein the first electronic message is an e-mail.

3. The method of claim 1, wherein the first electronic message is a text message.

4. The method of claim 1, wherein comparing the amount of the content that has changed to the threshold value comprises:
based on comparing the first metadata to the second metadata, determining a percentage of semantics that differ between the first metadata and the second metadata.

5. The method of claim 1, further comprising:
indicating, in the second electronic message, that the content has changed since the user previously accessed the content.

6. The method of claim 1, wherein the content is a portion of a larger content comprising the content and at least one other portion of content.

7. A method comprising:
receiving, by an electronic messaging server comprising a processor, from a first client device a first electronic message including at least one uniform resource identifier;
determining, by the electronic messaging server, whether a user to whom the first electronic message is sent has previously accessed content provided by a resource identified by the uniform resource identifier by determining whether the content provided by the resource has changed since the user previously accessed the content and, if so:
determining an amount of the content that has changed since the user previously accessed the content by performing natural language processing on the content in its current form and generating corresponding first metadata, and comparing the first metadata to second metadata generated from natural language processing performed on the content in a previous form provided when the user previously accessed the content; and
comparing the amount of the content that has changed to a threshold value;
responsive to determining that the amount of content that has changed does not at least equal the threshold value, automatically generating, by the electronic messaging server, a second electronic message corresponding to the first electronic message, the second electronic message including the uniform resource identifier and indicating, in the second electronic message, that the user has previously accessed the content provided by the resource identified by the uniform resource identifier; and
communicating, by the electronic messaging server, the second electronic message to a second client device of the user to whom the first electronic message is sent.

8. The method of claim 7, wherein the first electronic message is an e-mail.

9. The method of claim 7, wherein the first electronic message is a text message.

10. The method of claim 7, wherein comparing the amount of the content that has changed to the threshold value comprises:
based on comparing the first metadata to the second metadata, determining a percentage of semantics that differ between the first metadata and the second metadata.

11. The method of claim 7, further comprising:
indicating, in the second electronic message, that the content has changed since the user previously accessed the content.

12. The method of claim 7, wherein the content is a portion of a larger content comprising the content and at least one other portion of content.

\* \* \* \* \*